United States Patent
Biolik

[15] 3,695,110
[45] Oct. 3, 1972

[54] BABY THERMOMETER SPOON

[72] Inventor: Alexander Biolik, Marsstrasse 14, 8 Munich, Germany

[22] Filed: April 2, 1970

[21] Appl. No.: 25,199

[30] Foreign Application Priority Data

Sept. 29, 1969 South Africa............69/6804

[52] U.S. Cl. ............................................. 73/343 R
[51] Int. Cl. ....................... G01k 13/12, G01k 13/00
[58] Field of Search............ 73/343, 362.8, 354, 371

[56] References Cited

UNITED STATES PATENTS

| 782,433 | 2/1905 | Ashley..........................73/343 |
| 2,035,334 | 3/1936 | Monrad....................73/371 X |
| 3,277,714 | 10/1966 | Crandell.......................73/343 |
| 3,535,770 | 10/1970 | Crandell................73/362.8 X |
| 856,768 | 6/1907 | Comins..........................73/343 |
| 1,362,823 | 12/1920 | Sammons..................73/343 X |

FOREIGN PATENTS OR APPLICATIONS 587,261   4/1947   Great Britain...............73/343

Primary Examiner—Louis R. Prince
Assistant Examiner—Denis F. Corr
Attorney—Ernest G. Montague

[57] ABSTRACT

A temperature measuring device in the shape of a spoon or in another shape suited for feeding purposes comprising a feeding instrument having a handle and a food holding portion adapted for holding food to be eaten, the handle having a recess therein and a temperature measuring means disposed in the recess and adapted to be read to provide an indication of the temperature of the food held in the food holding portion.

9 Claims, 12 Drawing Figures

PATENTED OCT 3 1972 3,695,110

INVENTOR
ALEXANDER BIOLIK
BY
ATTORNEY

PATENTED OCT 3 1972 3,695,110
SHEET 2 OF 3
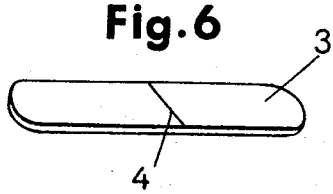
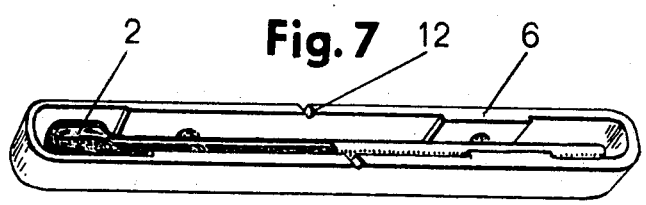
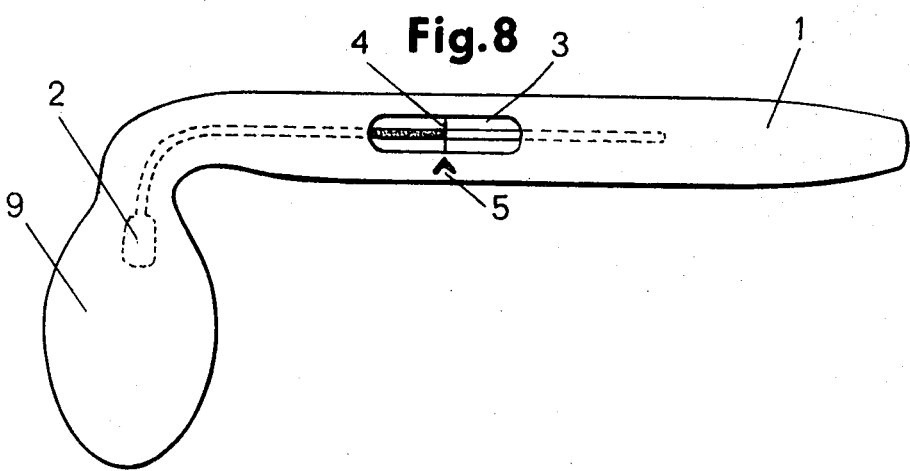
INVENTOR
ALEXANDER BIOLIK
BY
ATTORNEY.

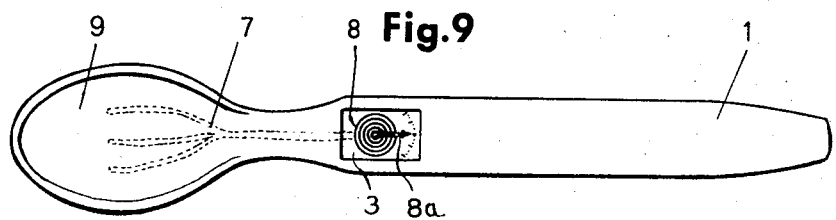
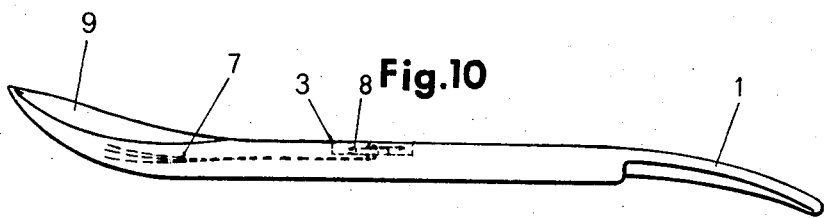
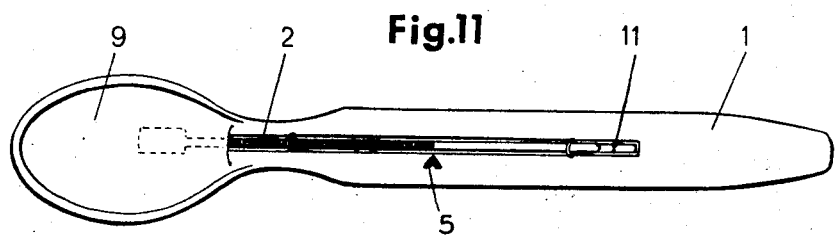
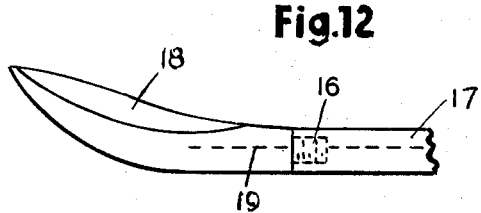

BABY THERMOMETER SPOON

The present invention relates to a measuring device, in general, and to a measuring device in the shape of a spoon, in particular.

It is an object of the present invention to provide a measuring device in the shape of a spoon which is appropriate for measuring the thermal reaction of substances filled in the hollow of the spoon, or appropriate for continuous control of the food temperature for patients suffering from gastric complaints, but particularly suited for the feeding of babies and infants, since the normal temperature for the foodstuffs to be fed to the baby can be read from the spoon when the hollow of the spoon is filled with food.

It is another object of the present invention to provide a piece of cutlery, preferably in the shape of a spoon, with temperature controlling instruments incorporated in the hollow of the spoon in such a manner that the temperature values may be read preferably through a glass window incorporated in the handle of the spoon.

The measuring instruments incorporated in the spoon may be either a thermometer capillary tube, or a bi-metal thermometer with heat-conducting device, or any other measuring device. This piece of cutlery is designed in such a manner that it contains a measuring instrument and an indicating device for temperatures.

The invention is based on the task of taking measurements of temperatures of chemical-physical processes, in particular of giving to gastric patients in the hand an instrument which enables them to read, while eating, the necessary normal temperature of their food, adapted to their particular needs, from the spoon itself. Primarily, however, this spoon has been designed for the same purpose in baby and infant feeding, enabling the feeding mother or nurse to control continuously the temperature of the food, which heretofore could only be verified by the mother's tasting of the baby's food on the spoon, which is insanitary.

Now, with the present invention the baby will no longer suffer from burns in the mouth or stomach caused by overheated food, or other injuries to his health, due to the feeding of food which was either too hot or too cold. An essential factor is the progress in mother and child hygiene. So far, mothers tasted the child's food with their own mouth, regardless of hygiene, lipstick, colds, or other infectious diseases, yet without being able to determine whether the food was still too hot, or already too cold for the baby.

With the thermometer spoon, in accordance with the present invention, the child is fed in a hygienic and sterile way, and the temperature being correctly adjusted. For infants, the thermometer spoon is even an excellent asset in education because it playfully educates the child to consume his food in a better way.

It is yet another object of the present invention to provide a temperature measuring device in the shape of a spoon or in another shape suited for feeding purposes comprising a feeding instrument having a handle and a food holding portion adapted for holding food to be eaten, the handle having a recess therein and a temperature measuring means disposed in the recess and adapted to be read to provide an indication of the temperature of the food held in the food holding portion.

With these and other objects in view, which will become apparent in the following detailed description, the present invention will be clearly understood in connection with the accompanying drawings, in which:

FIG. 4 is a section taken along the lines 4—4 of FIG. 1;

FIG. 5 is a section taken along the lines 5—5 of FIG. 1;

FIG. 6 is a perspective view showing the viewing window;

FIG. 7 is a perspective view showing a closing cap or hood with the thermometer therein;

FIG. 8 is a top plan view of another embodiment of a thermometer spoon; thermometer spoon;

FIG. 9 is a top plan view of still another embodiment of a thermometer spoon;

FIG. 10 is a side elevation of the spoon of FIG. 9;

FIG. 11 is a top plan view of yet another embodiment of a thermometer spoon; and FIG. 12 is a fragmentary top plan view of still another embodiment.

Figure 1:
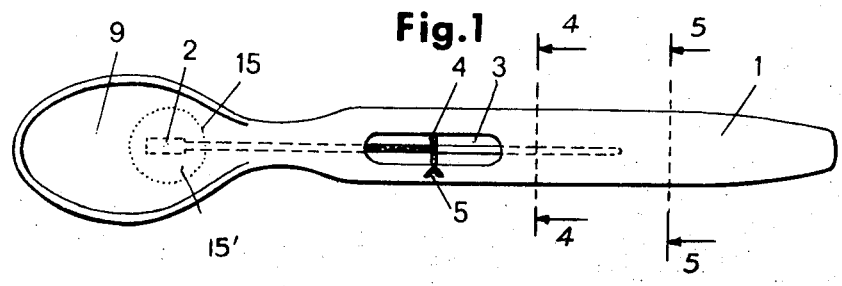
FIG. 1 is a top plan view of a thermometer spoon designed in accordance with the present invention.
Figure 2:
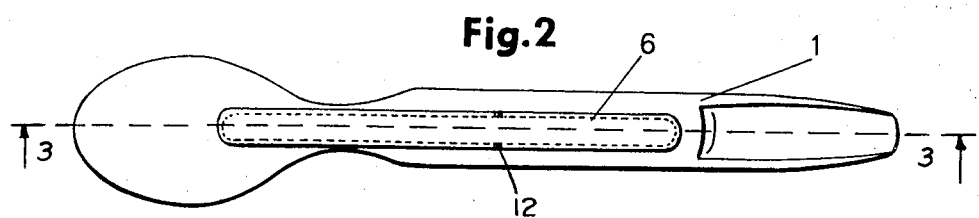
FIG. 2 is a bottom plan view of the thermometer spoon of FIG. 1.

Referring now to the drawings, and more particularly to FIGS. 1, 2, 8, 9 and 11, a device designed in accordance with the present invention may comprise in principle a feeding instrument in the shape of a spoon 1 which has been constructed for the purpose of utilizing the instrument as a temperature measuring instrument of the food held therein.

The spoon comprises three parts, namely, a handle, the front or the upper side of which has a window 3 of glass or the like on which a gauge mark 4 may be provided to indicate the normal temperature. In the rear part of the spoon, a shell 6 may be incorporated in which the thermometer capillary tube 2 (FIGS. 1, 2 and 11) has been placed, the thermometer capillary tube being gauged to the normal temperature.

As an alternative, a bi-metal thermometer 8 (FIGS. 9 and 10) may be placed on the upper side of the handle of the spoon, by which the normal temperature may be read through the glass window 3, by means of a pointer 8a, in the form of an arrow operatively being a part of the thermometer. In the latter case, heat-conducting devices 7 leading to the hollow of the spoon can be provided as the temperature sensitive responsive means for the bi-metal thermometer 8.

Referring now again to the drawings, and more particularly to FIG. 11, as another alternative, the thermometer capillary tube may be inserted in an open groove 11 formed on the front or upper side of the handle of the spoon.

Still as another alternative, the measuring range portion (FIG. 1) in the hollow of the spoon can be covered merely by a small metal plate 15, the thermometer capillary tube 2 being otherwise unprotected in so far as the spoon may be cast from plastic material. For babies and infants, the hollow of the spoon might be constructed at an angle of 45° to the handle (FIG. 8).

The temperature measuring instrument of the present invention preferably is in the shape of a spoon, or in another shape suited for feeding purposes. Measuring devices for example, in the form of a thermometer capillary tube 2, or a bi-metal thermometer 8, or any other form of measuring device, may be incorporated therein.

In accordance with the present invention, in the spoon, or any other feeding instrument, the recess 10 at the rear side of the spoon handle may extend up to the hollow 9 in which a thermometer capillary tube, or another measuring device, such as a bi-metal thermometer means 7, 8 is incorporated. On the rear side of the handle a closing means comprising a shell cap or hood 6 is positioned. At the front side of the handle, the glass window 3 may be incorporated, on which a gauge mark 4 is shown.

In connection with a capillary thermometer, an indicating arrow 5, as shown in FIGS. 1 and 8, may be placed on the front side of the handle and may point to the gauge mark 4 for the normal temperature. This gauge mark may correspond to the indent 12 (FIG. 6) provided on the closing means 6.

Figure 3:
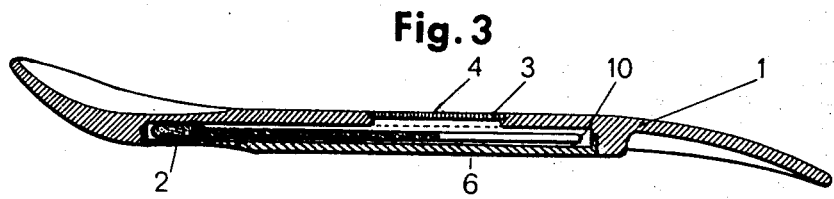
FIG. 3 is a section taken along the lines 3—3 of FIG. 2.

The handle of the spoon is adapted to the insertion requirements of the measuring instrument in question and may be curved upwardly or downwardly for better shape in the rear one third portion thereof (note FIG. 3, for example). As shown in FIG. 5, it may be smooth on the surface and molded as indicated below by a U-shaped cross-section 14, i.e., constituting an oval-like open cross section. The cross-section 13 of the intermediate portion of the handle may be shaped to take any given form, e.g., an oval-like round cross-section 13 (FIG. 4), or circular, square, or any other shape.

Referring now again to the drawings, and more particularly to FIGS. 3 and 7, the shell 6 is inserted in the recess 10 in the handle 1 in which the thermometer capillary tube 2 may be securely contained, the thermometer being gauged to an exact calculated temperature by the corresponding gauge mark 4 and the corresponding indent 12 in the shell 6.

The handle may be formed of a separate handle part 17, separate from a spoon-like portion 18 and adapted to be screwed together by means of cooperating screw-threaded portions 16 thereof, as shown in FIG. 12. Any type temperature measuring means 19 may be incorporated therein, as indicated in dashed lines.

The measuring device may be incorporated either in the handle or in the hollow 9 of the spoon, either separate or connected thereto, either completely inserted or cast into same.

With the exception of the glass window 3 and the measuring devices 2 or 8 incorporated in the spoon, the latter may be made completely of only a single material or of some metal. Alternately, it may be made completely of plastic material of any manufacture, or partly of plastic material and partly of metal. In the latter case, it would have a higher percentage of plastic material: the glass window 3 and the spoon 1 would be made of plastic, and the rear shell 6 for insertion of the measuring instrument would be of metal, the measuring range portion 15' above the capillary tube 2 being protected by the small metal plate 15. Further, the spoon may be constructed of metal and covered with a layer of plastic.

Also in accordance with the present invention, designs are included in which extractable thermometers have been built into the spoon, or thermometers which have been otherwise attached to the spoon.

While I have disclosed several embodiments of the present invention, it is to be understood that these embodiments are given by example only and not in a limiting sense.

I claim:

1. A temperature measuring device in the shape of a spoon suited for feeding purposes, comprising
   a feeding instrument having a handle and a food holding portion adapted for holding food to be eaten,
   said feeding instrument having a recess therein,
   a temperature measuring means disposed in said recess and operatively positioned so as to be responsive to the temperature of said food holding portion and readable to provide an indication of the temperature of food held in said food holding portion,
   said feeding instrument has a front side and a rear side,
   said recess is formed in said rear side and opens toward the latter along a substantial part of said handle and at least a portion of said food holding portion,
   a separate closing means complementary to said recess and positioned on said rear side and covering said temperature measuring means disposed therein, and
   a window on said front side facing said temperature measuring means in order to read the latter.

2. The device, as set forth in claim 1, wherein
   said food holding portion and said handle are separate pieces formed with complementary screw threads for attachment theretogether.

3. The device, as set forth in claim 1, wherein
   said temperature measuring means comprises a capillary tube extending to said food holding portion.

4. The device as set forth in claim 3, wherein
   said food holding portion is made of plastic, and
   a metal plate disposed in said food holding portion above said capillary tube for protecting the latter.

5. The device as set forth in claim 1, wherein
   said temperature measuring means comprises a thermometer capillary tube, and
   said window has a gauge mark thereon.

6. The device as set forth in claim 5, further comprising
   an indicating arrow on said front side of said handle pointing to said gauge mark of said window.

7. The device as set forth in claim 5, wherein
   said closing means constitutes a shell formed with a thermometer capillary tube positioning indent positioned corresponding to said gauge mark.

8. The device as set forth in claim 1, wherein
   said temperature measuring means includes a temperature sensitive portion located in said food holding portion.

9. A temperature measuring device in the shape of a spoon suited for feeding purposes, comprising
   a feeding instrument having a handle and a food holding portion adapted for holding food to be eaten,
   said feeding instrument having a recess therein,
   a temperature measuring means disposed in said recess and operatively positioned so as to be responsive to the temperature of said food holding portion and readable to provide an indication of the temperature of food held in said food holding portion, said temperature measuring means is a coiled bimetallic device having a pointer thereon and disposed in and viewable by means of a window portion located in a front side of said handle, said window portion being marked with graduations cooperating with said pointer, and a plurality of heat conducting devices disposed within said food holding portion and extending through said handle and connected to said bimetallic device.

* * * * *